A. J. Lewis.
Cultivator.
No. 91,031. Patented Jan. 8, 1869.
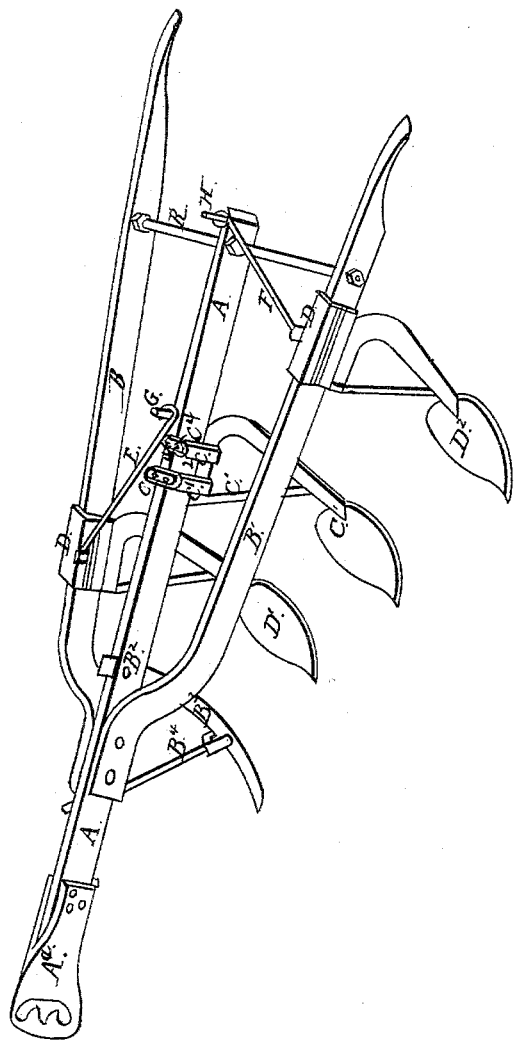
Witnesses:
Percival Beckett
John P Clark
Inventor:
Alfred John Lewis

United States Patent Office.

ALFRED JOHN LEWIS, OF PITTSBURG, PENNSYLVANIA.

Letters Patent No. 91,031, dated June 8, 1869.

IMPROVEMENT IN CULTIVATOR-PLOWS.

The Schedule referred to in these Letters Patent and making part of the same.

*To all whom it may concern:*

Be it known that I, ALFRED JOHN LEWIS, of Pittsburg, in the county of Allegheny, and State of Pennsylvania, have invented certain new and useful Improvements in Plows; and I do hereby declare that the following is a full, clear, and exact description thereof, reference being had to the accompanying drawings, and to the letters of reference marked thereon, which form a part of this specification.

My invention relates to that class of agricultural implements known as shovel-plows, or cultivators, and consists of suitable devices, whereby the shovels can be set and used in different positions, turning the furrow either to the right hand or left hand, as required.

To enable others skilled in the art to make and use my invention, I will describe its construction and operation.

In the accompanying drawings—

Figure 1 is a perspective view of my improvements in plows.

Letters of reference denote parts.

The main beam A of the plow consists of a bar of iron, or other suitable material, on the one end of which is attached, in any ordinary manner, an ordinary clevis, A.

Attached to said beam in any suitable manner, and curving out therefrom, are stilts B and B¹, their outer extremities being bent and rounded, so as to serve as handles.

A screwed rod, R, passes through said beam A and stilts B and B¹, having screwed nuts attached thereto, keeping said beams in position.

Attached to the beam A, by means of a clamp, or set-screw, B², and passing downward therefrom, is a curved knife, B³, of suitable material, to about the centre of which is attached a rod, B⁴, passing up and attached to the beam A, in such a manner that the knife B³ can be raised or lowered, as required.

About midway of said knife B³ and the extremity of the beam A, is a shovel, C, consisting of a bar of metal, bent around in such a manner as its upper part will be against and under the lower portion of said beam A, its lower extremity passing down and terminating with a shovel, of a heart or other suitable shape, a brace, C¹, projecting from the lower end to the upper part of the same, which is attached to the before-named beam A, by means of screwed clamps C² and C³, having cross-bars C⁴ bearing upon the upper face of said beam.

Ordinary nuts are screwed on to the clamps C² and C³, which being tightened, hold the shovel C firmly to the beam A.

Encircling the stilts B and B¹ are slides D, made in halves, and held together by means of bolts, or such like devices, the lower portion of said slides being attached to the upper portion of the shovels D¹ and D², of similar construction as before-named shovel C, these slides D being made in such a manner as they will move, if required, horizontally along the face of their respective stilts B and B¹.

Rods E and F, having eyes at each end, are attached to said slides in such a manner as they will encircle pins G and H, attached to the before-named beam A, the whole being so relatively arranged that the rod E being attached to the pin G, the shovel D¹ being in advance of the shovel C, and the rod F encircling the pin H, the shovel D² being in the rear of the said shovel C, the plow being drawn through the ground by any suitable power, the furrow will be turned to the left hand. By reversing the rods, so that the rod E will encircle the pin H, and the rod F encircle the pin G, the shovel D¹ will be brought to the rear of the shovel C, and the shovel D² to the front thereof. The furrow will be then turned to the right hand.

The knife B³ cuts through the sod and roots, clearing the passage for the shovels.

If required, the shovels D¹ and D² can be placed in a line, by placing both their respective rods on the same pin.

The shovel C can also be moved forward or back by slackening the nuts of the clamps C² and C³. They leave the shovel free for motion.

The advantages arising from the use of the described devices are, that as the shovels can be arranged and set at any required point, but one implement of such kind is required to perform the various work.

As heretofore implements of such class have been made, the shovels are attached firmly to their respective beams, and as some kinds of agricultural work require the shovels in different positions, several implements have been required, being costly, and taking time to make the necessary changes; and as my devices will regulate and hold in any position the shovels, but one implement is needed, saving thereby time and expense.

Having thus described the nature, construction, and operation of my invention,

What I claim as new, and desire to secure by Letters Patent, is—

1. The slides D, in combination with the shovels D¹ and D², substantially as described.

2. The slides D, with the rods E and F, pins G and H, in combination with the stilts B and B¹, substantially as set forth.

3. The knife B³, rod B⁴, in combination with the beam A, substantially as described.

4. The shovel C, when attached to the beam A, by means of clamps C² and C³, substantially as set forth.

5. The combination of the above-named devices in the construction of a shovel-plow, whereby the shovels can be set at any position, by means of the slides and rods, substantially as described and set forth.

In testimony that I claim the foregoing as my own, I affix my signature, in presence of two witnesses.

ALFRED JOHN LEWIS.

Witnesses:
PERCEVAL BECKETT,
JOHN P. CLARK.